United States Patent
Bailly

(10) Patent No.: US 12,066,532 B2
(45) Date of Patent: Aug. 20, 2024

(54) ULTRASOUND IMAGING DEVICE

(71) Applicant: MODULEUS, Tours (FR)

(72) Inventor: Adrien Bailly, Grenoble (FR)

(73) Assignee: MODULEUS, Tours (FR)

( * ) Notice: Subject to any disclaimer, the term of this patent is extended or adjusted under 35 U.S.C. 154(b) by 672 days.

(21) Appl. No.: 17/274,387

(22) PCT Filed: Sep. 11, 2019

(86) PCT No.: PCT/EP2019/074280
§ 371 (c)(1),
(2) Date: Mar. 8, 2021

(87) PCT Pub. No.: WO2020/053309
PCT Pub. Date: Mar. 19, 2020

(65) Prior Publication Data
US 2021/0341602 A1   Nov. 4, 2021

(30) Foreign Application Priority Data

Sep. 13, 2018 (FR) ..................................... 18/58199

(51) Int. Cl.
*G01S 15/89* (2006.01)
*B06B 1/02* (2006.01)
*G06T 11/00* (2006.01)

(52) U.S. Cl.
CPC ........ *G01S 15/8927* (2013.01); *B06B 1/0215* (2013.01); *G01S 15/8925* (2013.01); *G06T 11/003* (2013.01); *B06B 2201/76* (2013.01)

(58) Field of Classification Search
USPC ....................................................... 73/625
See application file for complete search history.

(56) References Cited

U.S. PATENT DOCUMENTS 5,203,335 A  *  4/1993  Noujaim ............. G01S 7/52028
                                                                          600/447
6,111,816 A     8/2000  Chiang et al.
(Continued)

FOREIGN PATENT DOCUMENTS

EP          1491913 A2    12/2004
WO     2003/000137 A1     1/2003
(Continued)

OTHER PUBLICATIONS

Authorized Officer: Sartoni, Giovanni, International Search Report issued in counterpart PCT application No. PCT/EP2019/074280, Dec. 13, 2019, 5 pp.

(Continued)

*Primary Examiner* — Clayton E. LaBalle
*Assistant Examiner* — Warren K Fenwick
(74) *Attorney, Agent, or Firm* — Kaplan Breyer Schwarz, LLP

(57) ABSTRACT

An ultrasonic imaging device includes a plurality of ultrasonic transducers arranged in an array of a plurality of rows and a plurality of columns, the array being divided into a plurality of sub-arrays of neighboring transducers, each including a plurality of rows and a plurality of columns, the device including, for each sub-array:
  a single transmit and/or receive circuit; and
  a combiner selector and/or splitter selector circuit configurable to couple any, alone, of the transducers of the sub-array to the transmit and/or receive circuit of the sub-array, or to simultaneously couple a plurality of the transducers of the sub-array to the transmit and/or receive circuit of the sub-array. The device further includes a control circuit adapted to individually controlling the combiner selector and/or splitter selector circuits of the different sub-arrays.

8 Claims, 5 Drawing Sheets

(56) References Cited

U.S. PATENT DOCUMENTS

| | | | |
|---|---|---|---|
| 6,352,510 B1* | 3/2002 | Barabash | G01S 15/8925 600/443 |
| 6,582,367 B1* | 6/2003 | Robinson | A61B 8/483 600/443 |
| 6,582,369 B1* | 6/2003 | Huang | G10K 11/346 600/447 |
| 6,994,674 B2* | 2/2006 | Sheljaskow | A61B 8/483 600/459 |
| 7,654,142 B2* | 2/2010 | Dominguez | G01N 29/06 73/598 |
| 8,702,609 B2* | 4/2014 | Hadjicostis | A61B 18/1492 600/439 |
| 2006/0119223 A1* | 6/2006 | Ossmann | G01S 15/8925 310/334 |
| 2009/0005684 A1 | 1/2009 | Kristoffersen et al. | |
| 2010/0174194 A1* | 7/2010 | Chiang | A61B 8/52 600/447 |
| 2014/0155751 A1 | 6/2014 | Banjanin et al. | |
| 2016/0287213 A1* | 10/2016 | Ishitsuka | A61B 8/54 |
| 2023/0168371 A1 | 6/2023 | Constans et al. | |

FOREIGN PATENT DOCUMENTS

| | | |
|---|---|---|
| WO | 2018/127655 A1 | 7/2018 |
| WO | 2020/053309 A1 | 3/2020 |

OTHER PUBLICATIONS

Authorized Officer: Sartoni, Giovanni, French Search Report issued in counterpart French patent application No. 18/58199, Jul. 11, 2019, 2 pp.

English translation of the Written Opinion of the International Search Authority issued in counterpart PCT application No. PCT/EP2019/074280, Dec. 13, 2019, 6 pp.

Authorized Officer: Zaneboni, Thomas, International Search Report issued in PCT application No. PCT/EP2021/059893, Jun. 17, 2021, 2 pp.

English Translation of the Written Opinion of the International Searching Authority issued in PCT application No. PCT/EP2021/059893, Jun. 17, 2021, 6 pp.

* cited by examiner (A)

(B)

(C)

ULTRASOUND IMAGING DEVICE

TECHNICAL BACKGROUND

The present disclosure concerns the field of ultrasonic imaging, and more particularly aims at an ultrasound imaging device comprising a plurality of ultrasonic transducers and an electronic circuit for controlling these transducers.

PRIOR ART

An ultrasound imaging device conventionally comprises a plurality of ultrasonic transducers, and an electronic control circuit connected to the transducers. In operation, the transducer assembly is placed in front of a body, an image of which is desired to be acquired. The electronic device is configured to apply electric excitation signals to the transducers to cause the transmission of ultrasound waves by the transducers, towards the body to be analyzed. The ultrasound waves transmitted by the transducers are reflected by the body to be analyzed (by its internal and/or surface structure), and then return to the transducers, which convert them back into electric signals. The electric response signals are read by the electronic control circuit and may be stored and analyzed to deduce therefrom information relative to the studied body.

The ultrasonic transducers may be arranged in a linear array in the case of two-dimensional image acquisition devices, or in an array in the case of three-dimensional image acquisition devices. In the case of a two-dimensional image acquisition device, the acquired image is representative of a cross-section of the studied body in a plane defined by the alignment axis of the transducers of the linear array on the one hand, and by the transmission direction of the transducers on the other hand. In the case of a three-dimensional image acquisition device, the acquired image is representative of a volume defined by the two alignment directions of the transducers of the array and by the transmission direction of the transducers.

Three-dimensional image acquisition devices are more particularly considered herein. In such devices, the number of ultrasonic transducers may be very high, typically from several hundreds to several thousands, or even more. This raises issues for the forming of the electronic transducers control circuit and/or for the transmission of the acquired data to an external processing system.

Three-dimensional image acquisition devices where the electronic control circuit comprises a number of transmit and/or receive circuits smaller than the number of transducers, and multiplexing circuits controlled so that, during an ultrasound image acquisition phase, different transducers share a same transmit and/or receive circuit, have already been provided. This enables to limit the bulk of the electronic control circuit, and to ease the transmission and the processing of the acquired data. Known devices however have limitations, particularly due to the limited possibilities of configuration of the links between the transducer array and the transmit and/or receive circuits of the device.

SUMMARY

An object of an embodiment is to provide a three-dimensional ultrasound image acquisition device overcoming all or part of the disadvantages of known devices.

For this purpose, an embodiment provides an ultrasonic imaging device comprising a plurality of ultrasonic transducers arranged in an array of a plurality of rows and a plurality of columns, the array being divided into a plurality of sub-arrays of neighboring transducers each comprising a plurality of rows and a plurality of columns, the device comprising, for each sub-array:
  a single transmit and/or receive circuit; and
  a combiner selector and/or splitter selector circuit configurable to couple any, alone, of the transducers of the sub-array to the transmit and/or receive circuit of the sub-array, or to simultaneously couple a plurality of the transducers of the sub-array to the transmit and/or receive circuit of the sub-array,
the device further comprising a control circuit adapted to individually controlling the combiner selector and/or splitter selector circuits of the different sub-arrays.

According to an embodiment, the control circuit is configured to, during an ultrasonic image acquisition phase, control the combiner selector and/or splitter selector circuits to, simultaneously:
  in a first sub-array, couple a single transducer of the sub-array to the transmit and/or receive circuit of the sub-array; and
  in a second sub-array, couple a plurality of transducers of the sub-array to the transmit and/or receive circuit of the sub-array.

According to an embodiment, the control circuit is configured to, during an ultrasonic image acquisition phase, control the combiner selector and/or splitter selector circuits to, in each sub-array, simultaneously couple all the transducer of the sub-array to the transmit and/or receive circuit of the sub-array.

According to an embodiment, the control circuit is configured to, during an ultrasonic image acquisition phase, control the combiner selector and/or splitter selector circuits to, in each sub-array, simultaneously couple all the transducer of the sub-array to the transmit and/or receive circuit of the sub-array.

According to an embodiment, the control circuit is configured to, during an ultrasonic image acquisition phase, control the combiner selector and/or splitter selector circuits to, in each sub-array, successively:
  simultaneously couple all the transducers of a same column of the sub-array to the transmit and/or receive circuit of the sub-array and simultaneously isolate the other transducers of the sub-array from the transmit and/or receive circuit of the sub-array;
  simultaneously couple all the transducers of a same row of the sub-array to the transmit and/or receive circuit of the sub-array and simultaneously isolate the other transducers of the sub-array from the transmit and/or receive circuit of the sub-array; and
  simultaneously couple all the transducers of a same diagonal of the sub-array to the transmit and/or receive circuit of the sub-array and simultaneously isolate the other transducers of the sub-array from the transmit and/or receive circuit of the sub-array.

According to an embodiment, each transmit and/or receive circuit comprises a transmit circuit and a receive circuit.

According to an embodiment, for each sub-array, the combiner selector and/or splitter selector circuit comprises a transmit splitter selector from one input terminal to m*n output terminals, m and n being integers respectively designating the number of rows and the number of columns of the sub-array, and a receive combiner selector from m*n input terminals to one output terminal, and:
  the input terminal of the transmit splitter selector is coupled to an output terminal of the transmit circuit;

the m*n output terminals of the transmit splitter selector are respectively coupled to the m*n transducers of the sub-array;

the m*n input terminals of the receive combiner selector are respectively coupled to the m*n transducers of the sub-array; and the output terminal of the receive combiner selector is coupled to an input terminal of the receive circuit.

According to an embodiment, in each combiner selector and/or splitter selector circuit, the m*n output terminals of the transmit splitter selector are coupled to the m*n transducers of the sub-array by respectively m*n transmit switches, and the m*n input terminals of the receive combiner selector are coupled to the m*n transducers of the sub-array by respectively m*n receive switches.

According to an embodiment, in each combiner selector and/or splitter selector circuit, the m*n input terminals of the receive splitter selector are further coupled to the m*n transducers of the sub-array by respectively m*n preamplifiers.

According to an embodiment, the control circuit is configured to control the combiner selector and/or splitter selector circuits to, during an ultrasonic image acquisition phase, in each sub-array, during an ultrasonic wave transmission phase, couple a first set of ultrasonic transducers of the sub-array to the transmit circuit of the sub-array, and, during a subsequent phase of reception of an ultrasonic wave, couple a second set of ultrasonic transducers of the sub-array, different from the first set, to the receive circuit of the sub-array.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DESCRIPTION OF THE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the various possible applications of described imaging devices have not been detailed, the described embodiments being compatible with usual applications of ultrasonic imaging devices. Further, the properties (frequencies, shapes, amplitudes, etc.) of the electric excitation signals applied by the control circuit to the ultrasonic transducers have not been detailed, the described embodiments being compatible with the excitation signals currently used in ultrasonic imaging systems, which may be selected according to the considered application and in particular to the nature of the body to be analyzed and to the type of information which is desired to be acquired. Similarly, the various processings applied to the electric signals delivered by the ultrasonic transducers and read by the control circuit to extract useful information relative to the body to be analyzed have not been detailed, the described embodiments being compatible with processings currently used in ultrasonic imaging systems. Further, the forming of the ultrasonic transducers and of the control circuit of the described imaging devices has not been detailed, the detailed structure of these elements being within the abilities of those skilled in the art based on the indications of the present disclosure, by using known ultrasonic transducer and electronic circuit forming techniques.

Unless specified otherwise, when reference is made to two elements connected together, this signifies a direct connection without any intermediate elements other than conductors, and when reference is made to two elements coupled together, this signifies that these two elements can be connected or they can be coupled via one or more other elements.

Figure 1:
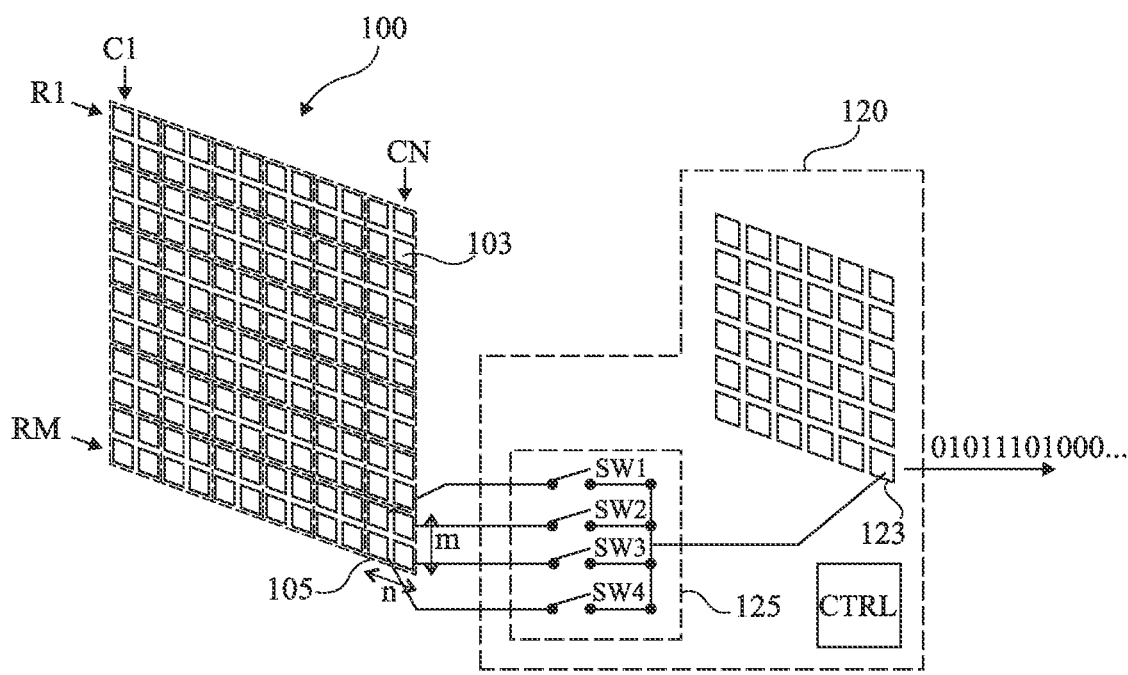
FIG. 1 is a simplified perspective view of an example of an ultrasonic image acquisition device according to an embodiment.

FIG. 1 is a simplified perspective view of an example of an ultrasonic image acquisition device according to an embodiment.

The device of FIG. 1 comprises an array 100 of elementary ultrasonic transducers 103, arranged in M rows Ri, I being an integer in the range from 1 to M, and N columns Ci, j being an integer in the range from 1 to N, M and N being integers greater than 1. In the shown example, M=N=12. The described embodiments are of course not limited to this specific case. It should in particular be noted that values M and N may be different from each other. Elementary transducers 103 are for example all identical, to within manufacturing dispersions. Transducers 103 may be CMUT-type transducers (capacitive membrane ultrasonic transducers), piezoelectric transducers, crystal transducers, or any other type of ultrasonic transducers.

In the embodiment of FIG. 1, array 100 is divided into a plurality of sub-arrays 105 of neighboring transducers, each comprising a plurality of rows and a plurality of columns. Neighboring transducers here means that, in each sub-array 105, the transducers 103 of the sub-array are gathered, that is, no transducer 103 of another sub-array 105 is arranged between two transducers 103 of the sub-array. In other words, each sub-array 105 is formed by all the transducers 103 located at the intersection of an assembly of a plurality of consecutive rows Ri and of a plurality of consecutive columns Cj of array 100. In the example of FIG. 1, sub-arrays 105 do not overlap, that is, each transducer 103 belongs to a single sub-array 105 of the device. Sub-arrays 105 for example all have the same dimensions. Hereafter, m and n respectively designate the number of rows and the number of columns of each sub-array 105, m and n being integers greater than or equal to 2. In the shown example, m=n=2. The described embodiments are however not limited to this specific case. It should in particular be noted that values m and n may be different from each other. Preferably, M is a multiple of m and N is a multiple of n. Thus, array 100 is divided into (M/m)*(N/n) sub-arrays 105 arranged in an array layout. In the example of FIG. 1, array 100 is divided into 6×6 sub-arrays 105.

The device of FIG. 1 further comprises an electronic control circuit 120 connected to the transducers 103 of array 100. Electronic control circuit 120 comprises, for each sub-array 105 of array 100, a single transmit and/or receive circuit 123 specifically dedicated to the transducers 103 of sub-array 105, and a combiner selector and/or splitter selector circuit 125 specifically dedicated to the transducers 103 of sub-array 105, configurable to couple any, alone, of the transducers of sub-array 105 to transmit and/or receive circuit 123, or to simultaneously couple a plurality of the transducers of sub-array 105 to transmit and/or receive circuit 123. Thus, electronic control circuit 120 comprises (M/m)*(N/n) transmit and/or receive circuits 123, for example, identical or similar, and (M/m)*(N/n) combiner selector and/or splitter selector circuits 125, for example, identical or similar. Each circuit 125 is equivalent to a combiner selector from m*n inputs to a single output and/or to a splitter selector from a single input to m*n outputs. For simplification, a single combiner selector and/or splitter selector circuit 125 has been shown in FIG. 1.

In the example of FIG. 1, each transducer 103 can only be coupled to the transmit and/or receive circuit 123 associated with the sub-array 105 to which it belongs. In other words, the combiner selector and/or splitter selector circuits 125 do not enable to couple a transducer 103 of a sub-array 105 to a transmit and/or receive circuit 123 associated with another sub-array 105, and do not enable to couple together transducers 103 belonging to different sub-arrays 105.

Figure 2:
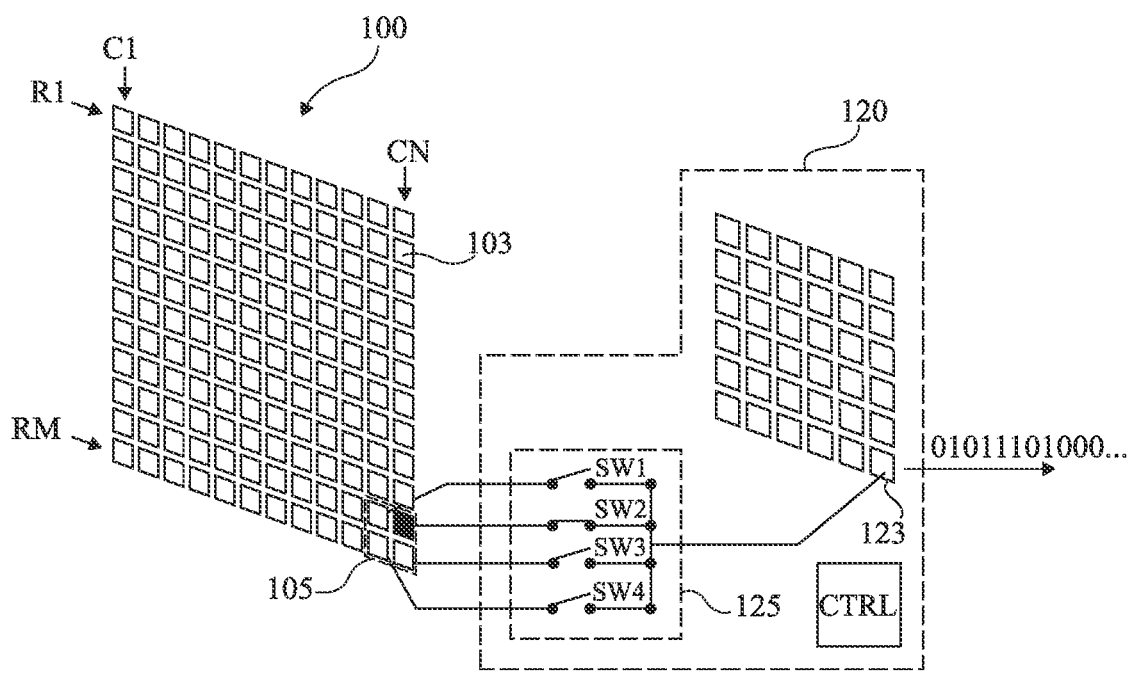
FIG. 2 illustrates an example of configuration of the device of FIG. 1.

In the example of FIG. 1, circuit 125 has been schematically shown in the form of m*n switches SWk, k being an integer in the range from 1 to m*n, respectively coupling in parallel the m*n transducers 103 of sub-array 105 to a same transmit and/or receive circuit 123. Thus, when a single one of the switches SWk of circuit 125, is on, the corresponding transducer 103 may be individually excited and/or read by transmit and/or receive circuit 123. This configuration is illustrated in FIG. 2, where only the switch SW2 of circuit 125 is on, whereby a single transducer 103 (shown in black in FIG. 2) of sub-array 105 is activated.

Figure 3:
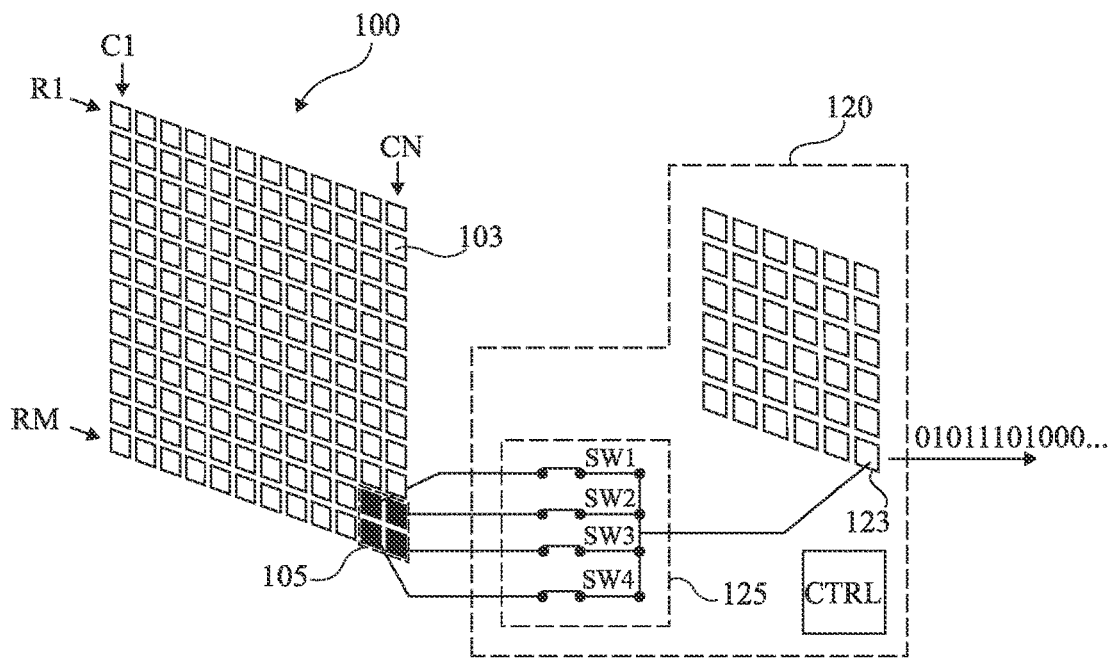
FIG. 3 illustrates another example of configuration of the device of FIG. 1.

When a plurality of the switches SWk of circuit 125 are simultaneously on, the corresponding transducers 103 may be simultaneously excited and/or read by transmit and/or receive circuit 123, and thus act together as a single transducer of larger size. This configuration is illustrated in FIG. 3, where all the switches SWk of circuit 125 are on, so that all the transducers 103 of sub-array 105 (shown in black in FIG. 3) are simultaneously activated.

It should be noted that in the embodiment of FIG. 1, the (M/m)*(N/n) circuits 125 are individually controllable. In other words, it may be provided, at a same time of an ultrasonic image acquisition phase, to differently configure combiner selector and/or splitter selector circuits 125 associated with different sub-arrays 105. For this purpose, electronic control circuit 120 may comprise a single control circuit CTRL coupled to control terminals (not detailed in FIG. 1) of the different circuits 125.

An advantage of the embodiment of FIG. 1 is that the layout of the combiner selector and/or distributor selector circuits 125 and, more particularly, the division of array 100 into a plurality of sub-arrays of neighboring transducers coupled to a same transmit and/or receive circuit via a combiner selector and/or splitter selector circuit, enables to implement various strategies of ultrasonic image acquisition capable of being selected according to the type of body to be analyzed and/or to the data which are desired to be acquired. Examples of methods of ultrasonic image acquisition by means of the device of FIG. 1 will now be described in relation with FIGS. 4 to 9.

Figure 4:
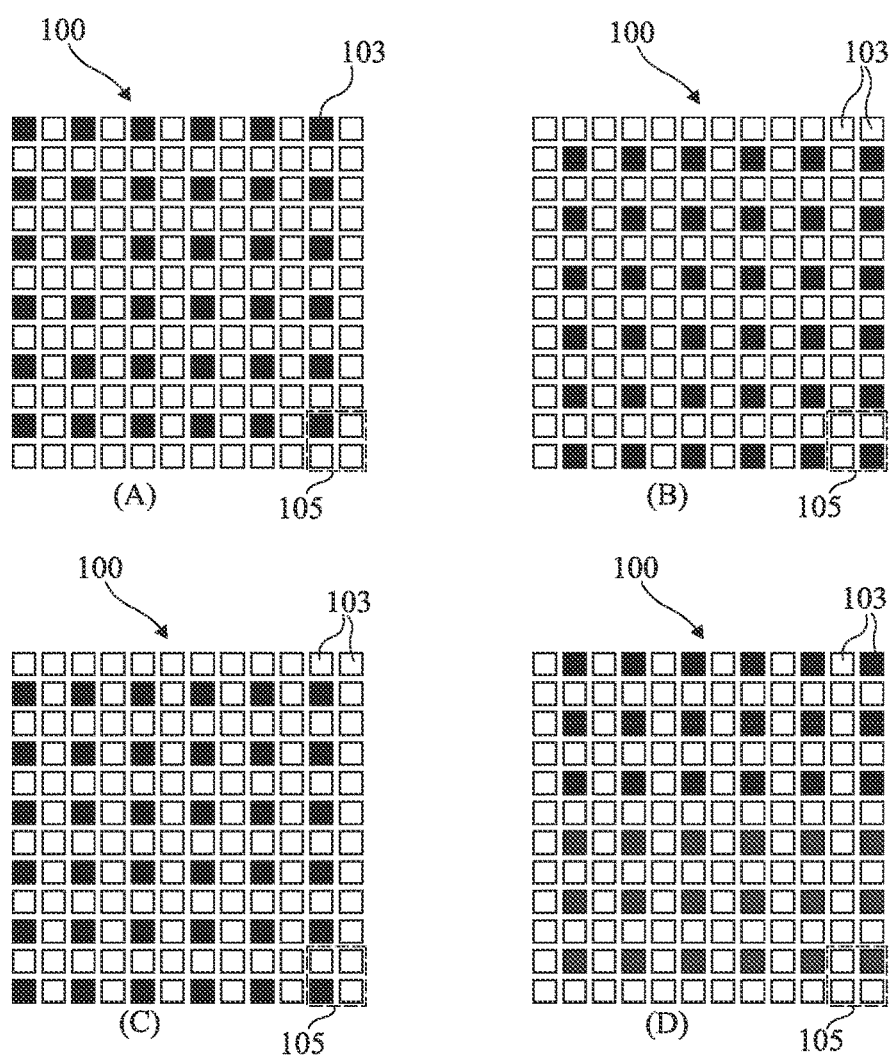
FIG. 4 illustrates an example of a method of acquisition of an ultrasonic image by means of the device of FIG. 1.

FIG. 4 illustrates an example of a method of acquisition of an ultrasonic image by means of the device of FIG. 1. In the method of FIG. 4, m*n partial image acquisitions are successively performed, after which a final image is reconstructed from the m*n acquired partial images. For each acquisition of a partial image, a single transducer 103 of each sub-array 105 is activated. More particularly, in this example, each acquisition of a partial image comprises a phase of transmission of an ultrasonic wave followed by a phase of reception of an echo of the transmitted ultrasonic wave. During the transmission phase, in each sub-array 105, a single transducer 103 is coupled to the circuit 123 associated with sub-array 125, the other transducers being isolated from circuit 123. Circuit 123 then applies to the activated transducer 103 an electric excitation signal to cause the transmission of an ultrasonic wave by this transducer only. During the receive phase, in each sub-array 105, the same single transducer 103 is coupled to the circuit 123 associated with sub-array 105, the other transducers being isolated from circuit 123. Circuit 123 then reads an electric signal representative of an ultrasonic echo received by this transducer only. At each new acquisition of a partial image, the combiner selector and/or splitter selector circuits 125 are reconfigured, to successively involve the m*n transducers 103 of each sub-array 105.

In FIG. 4, four view (A), (B), (C), and (D) of array 100, corresponding to four successive configurations of the circuits 125 of the device during an ultrasonic image acquisition phase according to this method have been shown as an example. In this drawing as well as in the following FIGS. 5 to 9, the active transducers 103 (that is, coupled to the transmit and/or receive circuits 123 via circuits 125) have been shown in black and the inactive traducers 103 (that is, isolated from the transmit and/or receive circuits 123 by circuits 125) have been shown in white. It should be noted that in the example shown in FIG. 4, at each phase of acquisition of a partial image, the circuits 125 are all configured in the same way, that is, at each phase of acquisition of a partial image, the position of the activated transducer is the same as in all the sub-arrays 105 of the device. The described embodiments are however not limited to this specific case.

An advantage of the acquisition method of FIG. 4 is that it enables to obtain high-resolution images since each transducer 103 of the array is individually activated and read during the acquisition phase.

As a variant, it may be provided, at each acquisition of a partial image, during the transmission phase, to activate all the transducers of each sub-array 105 and, during the receive phase, to activate a single transducer of each sub-array 105 as previously described. An advantage is that this enables to send more mechanical energy into the medium to be analyzed during the transmission, and thus to improve the signal-to-noise ratio of the image, while benefitting from a high resolution since each transducer 103 of the array is read individually.

Figure 5:
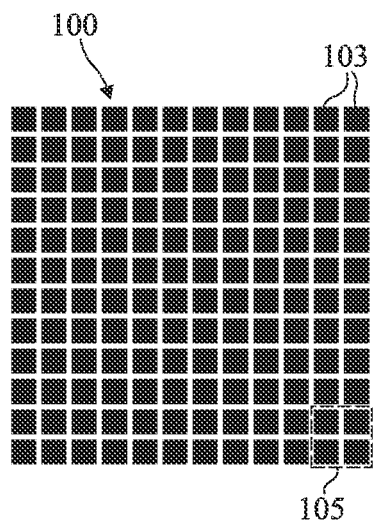
FIG. 5 illustrates another example of a method of acquisition of an ultrasonic image by means of the device of FIG. 1.

FIG. 5 illustrates another example of a method of acquisition of an ultrasonic image by means of the device of FIG. 1. In the method of FIG. 5, a single acquisition phase is implemented, at the end of which the final image is generated. During the acquisition phase, the m*n transducers 103 of each sub-array 105 are simultaneously activated. More particularly, in this example, the acquisition phase comprises a phase of transmission of an ultrasonic wave followed by a phase of reception of an echo of the transmitted wave. During the transmit phase, in each sub-array 105, the m*n transducers 103 of the sub-array are simultaneously coupled to the circuit 123 associated with sub-array 105. Circuit 123 then applies to all the transducers 103 of the sub-array an electric excitation signal so that each of these transducers simultaneously transmits a same ultrasonic wave. During the receive phase, in each sub-array 105, the m*n transducers 103 of the sub-array are simultaneously coupled to the circuit 123 associated with sub-array 105. Circuit 123 then reads an electric signal representative of the sum of the electric signals simultaneously delivered by the m*n transducers 103 of the sub-array.

As compared with the method of FIG. 4, an advantage of the acquisition method of FIG. 5 is that it enables to obtain an image in a single ultrasound shot (to be compared with m*n successive shots in the example of FIG. 4). Further, the total ultrasonic power transmitted and received during the acquisition is higher than the total ultrasonic power transmitted and received during each partial acquisition of the method of FIG. 4, which may be advantageous in certain applications. These advantages are however obtained to the detriment of the resolution of the final image since, in the example of FIG. 5, array 100 is actually used like an array of (M/m)×(N/n) transducers of larger dimensions.

Figure 6:
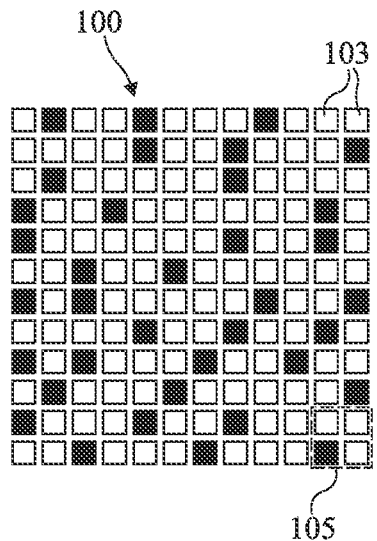
FIG. 6 illustrates another example of a method of acquisition of an ultrasonic image by means of the device of FIG. 1.

FIG. 6 illustrates another example of a method of acquisition of an ultrasonic image by means of the device of FIG. 1. In the method of FIG. 6, a single acquisition phase is implemented, at the end of which the final image is obtained. During the acquisition phase, part of or all the m*n transducers 103 of each sub-array 105 are deactivated. The activated transducers 103 are distributed according to an irregular and sparse layout, for example, according to a random or pseudo-random layout. Of course, the distribution of the activated transducers may be different from that shown in FIG. 6. An advantage of this type of distribution is that it enables to obtain a relatively accurate image of the studied object, in a single ultrasound shot.

Figure 7:
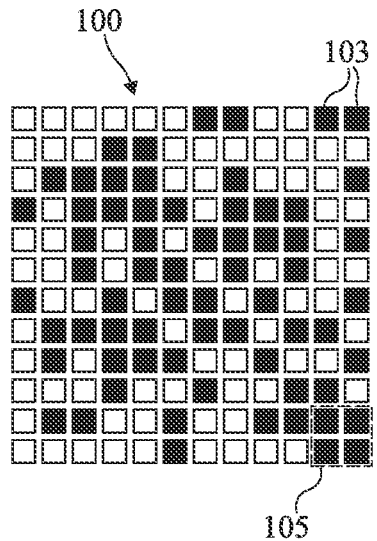
FIG. 7 illustrates another example of a method of acquisition of an ultrasonic image by means of the device of FIG. 1.
Figure 8:
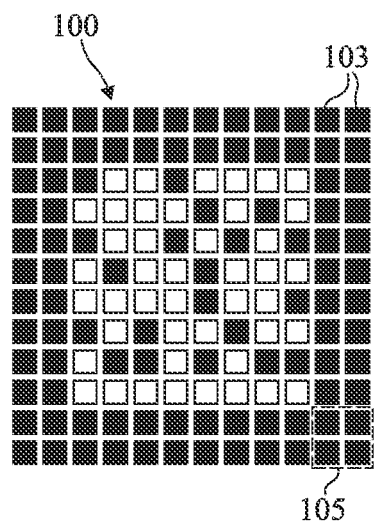
FIG. 8 illustrates another example of a method of acquisition of an ultrasonic image by means of the device of FIG. 1.

FIG. 7 illustrates another example of a method of acquisition of an ultrasonic image by means of the device of FIG. 1. As in the example of FIG. 6, a single acquisition phase is implemented, at the end of which the final image is obtained. A difference with the method of FIG. 6 is that, in the example of FIG. 7, during the acquisition phase, in some (but not all) of sub-arrays 105, all the m*n transducers 103 of the sub-array are simultaneously activated. An advantage is that this enables, while keeping the advantages of the method of FIG. 6, to benefit from a strong ultrasonic power in certain areas of the device, and thus to improve the signal-to-noise ratio of the final image. In the example of FIG. 7, the sub-arrays 105 having all their transducers simultaneously activated are arranged in an irregular and sparse layout, for example, randomly or pseudo-randomly. As a variant, the sub-arrays 105 having all their transducers simultaneously activated may be distributed according to a regular distribution, for example, in a peripheral region of array 100 as illustrated in FIG. 8.

Figure 9:
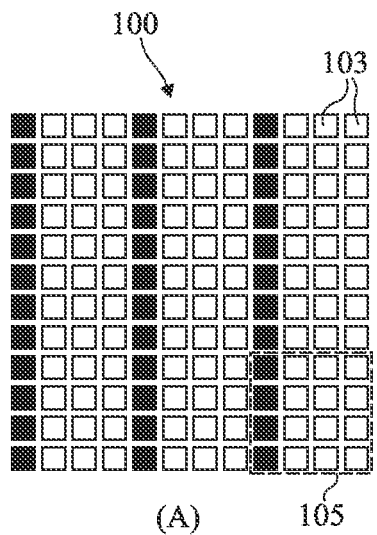
FIG. 9 illustrates another example of a method of acquisition of an ultrasonic image by means of the device of FIG. 1.
Figure 9:
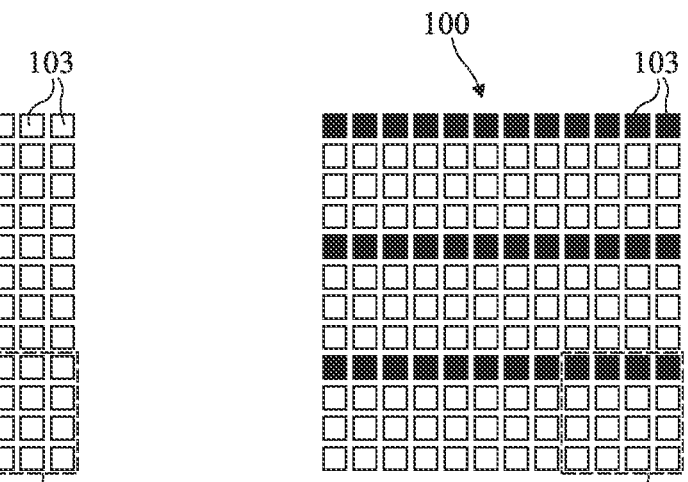
Figure 9:
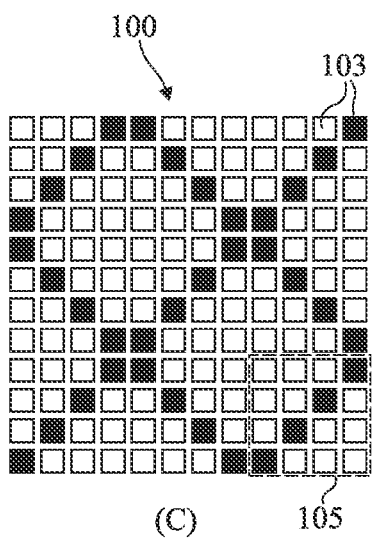

FIG. 9 illustrates another example of a method of acquisition of an ultrasonic image by means of the device of FIG. 1. In the method of FIG. 9, three partial image acquisitions are successively performed, after which a final image is reconstructed from the 3 acquired partial images. During the first phase of acquisition of a partial image, in each sub-array 105, all the transducers of a same column of sub-array 105 are activated simultaneously, the transducers of the other columns of sub-array 105 being deactivated. More particularly, in this example, during the first phase of acquisition of a partial image, all the transducers 103 of N/n columns of array 100, regularly distributed in array 100, are simultaneously activated, the transducers of the other columns of array 100 being deactivated. During the second phase of acquisition of a partial image, in each sub-array 105, all the transducers of a same row of sub-array 105 are activated simultaneously, the transducers of the other rows of sub-array 105 being deactivated. More particularly, in this example, during the first phase of acquisition of a partial image, all the transducers 103 of M/m rows of array 100, regularly distributed in array 100, are simultaneously activated, the transducers of the other rows of array 100 being deactivated. During the third phase of acquisition of a partial image, in each sub-array 105, all the transducers of a same diagonal of sub-array 105 are activated simultaneously, the other transducers of sub-array 105 being deactivated. It should be noted that in the example of FIG. 9, sub-arrays 105 of 4×4 transducers 103 have been considered, rather than sub-arrays 105 of 2×2 transducers as in the previous examples. The method of FIG. 9 may however of course be applied whatever the dimensions of sub-arrays 105.

Figure 10:
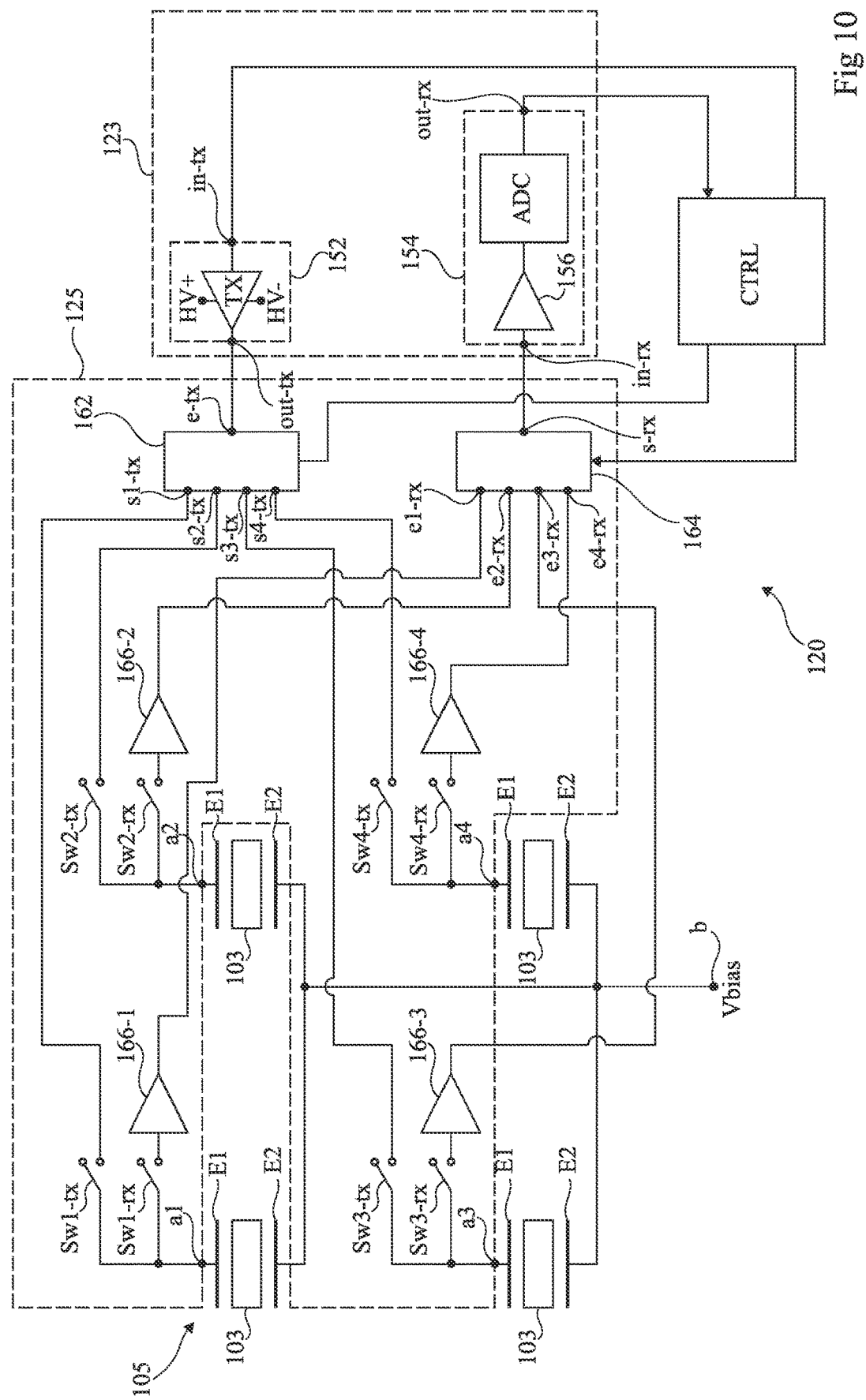
FIG. 10 is an electric diagram illustrating in further detail an embodiment of the device of FIG. 1.

FIG. 10 is an electric diagram illustrating in further detail an embodiment of the device of FIG. 1. In FIG. 10, a single sub-array 105 of 2×2 transducers 103 is shown, as well as the combiner selector and/or splitter selector circuit 125 and the associated transmit/receive circuit 123, and the control circuit CTRL of electronic control circuit 120. To form the full electronic control circuit 120, circuits 125 and 123 may be replicated as many times as there are sub-arrays 105 in array 100. Control circuit CTRL is common to all the circuits 125 and all the circuits 123 of the device.

Each transducer 103 comprises two electrodes E1 and E2. When an appropriate excitation voltage is applied between its electrodes E1 and E2, the transducer transmits an ultrasonic acoustic wave. When the transducer receives an ultrasonic acoustic wave within a given wavelength range, it delivers between its electrodes E1 and E2 a voltage representative of the received wave.

Each circuit 125 comprises m*n terminals ak (k being an integer in the range from 1 to m*n) coupled, for example, connected, respectively to the m*n electrodes E1 of the transducers 103 of the corresponding sub-array. The electrodes E2 of the transducers 103 of array 100 are all coupled, for example connected, to a same terminal b for supplying a DC bias voltage Vbias of circuit 120.

In this example, each circuit 123 comprises a transmit circuit 152 and a receive circuit 154.

In the shown example, each transmit circuit 152 comprises a single pulse generator TX. Each pulse generator TX comprises an input node in_tx adapted to receiving a logic control signal, and an output node out_tx adapted to delivering an electric excitation signal to the transducers 103 of the corresponding sub-array 105. In this example, when the logic signal applied to input node in_tx of generator TX is in a first state, for example, a high state, generator TX delivers on its output node out_x a high-level voltage HV+ and, when the logic signal applied to node in_tx of generator TX is in a second state, generator TX delivers on its output node out_tx a low-level voltage HV−. As an example, voltages HV+ and HV− are respectively positive and negative with respect to the DC bias voltage Vbias of the device. As a variant, voltage HV− is equal to bias voltage Vbias, and voltage HV+ is positive with respect to voltage Vbias. The output signal of pulse generator TX corresponds to a signal of excitation of one or a plurality of the transducers 103 of sub-array 105, which may be applied to the electrode(s) E1 of the transducer(s) activated via circuit 125 during a phase of transmission of an ultrasonic wave. The voltage level of the excitation signal is relatively high, for example, in the order of from 10 to 50 volts peak to peak (that is, between low level HV− and high level HV+). As an example, circuit 120 may comprise a DC/DC voltage converter (not shown) capable of generating, from a lower power supply voltage (not shown) of circuit 120, for example, in the range from 1 to 5 volts, the power supply voltages HV+ and, possibly, HV− of pulse generators TX.

Control circuit CTRL comprises output terminals coupled, for example, connected, to the input nodes in_tx of the different pulse generators TX. Control circuit CTRL is adapted to applying logic control sequences to the different pulse generators TX. Control circuit CTRL particularly enables to individually control the different pulse generators TX, simultaneously and sequentially. Control circuit CTRL for example comprises one or a plurality of digital processing or conditioning circuits (not detailed), for example, of microprocessor or programmable logic circuit type (for example, FPGA), and one or a plurality of memory circuits (not detailed). Control circuit CTRL is for example adapted to storing a plurality of predetermined transducer excitation scenarios, for example corresponding to different excitation frequencies, and capable of being selected by the user according to the envisaged application.

Each receive circuit 154 is adapted to amplifying and digitizing an electric signal representative of the sum of the electric response signals generated by the ultrasonic transducers of sub-array 105 activated via circuit 125 during an ultrasonic wave reception phase. In the example of FIG. 10, each receive circuit 154 comprises an amplifier 156, preferably low-noise, having its input coupled, for example, connected, to an input node in_rx of circuit 154, and an analog-to-digital converter ADC having its input coupled, for example, connected, to the output of amplifier 156 and having its output coupled, for example, connected, to an output port out_rx (for example, over a plurality of bits) of receive circuit 154. The output out_rx of receive circuit 154 is coupled, for example, connected, to an input port of control circuit CTRL.

In practice, receive circuits 154 may comprise additional elements, not detailed herein, such as an impedance matching circuit between input node in_rx and the input of amplifier 156, a gain adjustment circuit between the output of amplifier 156 and the input of the ADC converter, and/or an anti-aliasing analog filter between the output of amplifier 156 and the input of converter ADC, for example between the output of the gain adjustment circuit and the input of converter ADC. For further detail as to the forming of transmit and receive circuits 152 and 154, reference may for example be made to patent application WO2018/127655 previously filed by the applicant.

Each circuit 125 is adapted, during an ultrasonic wave transmission phase, to coupling the output node out_tx of transmit circuit 152 to the electrodes E1 of one or a plurality of transducers 103 of sub-array 105, and, during a phase of reception of an ultrasonic wave, to coupling the input node in_rx of receive circuit 156 to the electrodes E1 of one or a plurality of transducers 103 of sub-array 105.

In the example of FIG. 10, each circuit 125 comprises a splitter selector circuit 162 and a splitter selector circuit 164. Circuit 162 is a splitter selector from one input terminal e_tx to m*n output terminals sk_tx (k being an integer in the range from 1 to m*n). As an example, circuit 162 comprises m*n individually controllable switches (not detailed in the drawing), respectively coupling in parallel its m*n output terminals sk_tx to its input terminal e_tx. Circuit 164 is a combiner selector from m*n input terminals ek_rx (k being an integer in the range from 1 to m*n) to one output terminal s_rx. As an example, circuit 164 comprises m*n individually controllable switches (not detailed in the drawing), respectively coupling in parallel its m*n input terminals ek_rx to its output terminal s_rx. Each of circuits 162 and 164 comprises one or a plurality of configuration terminals coupled, for example, connected, to corresponding output terminals of control circuit CTRL.

The input terminal e_tx of splitter selector 162 is coupled, for example connected, to the output terminal out_tx of transmit circuit 152. The output terminal s_rx of combiner selector 164 is coupled, for example, connected, to the input terminal in_rx of receive circuit 154.

In the example of FIG. 10, circuit 125 further comprises m*n switches SWk_tx (k being an integer in the range from 1 to m*n) respectively coupling the m*n terminals ak to the m*n output terminals sk_tx of circuit 162. More particularly, in the shown example, for each transducer 103 of sub-array 105, corresponding switch SWk_tx has a first conduction terminal coupled, for example, connected, to the terminal ak coupled to the transducer electrode E1, and a second conduction terminal coupled, for example, connected, to the output terminal sk_tx of same rank of splitter selector 162. The function of switches SWk_tx is to enable to isolate the transducers of the transmission path during a phase of reception of an ultrasonic signal, to avoid signal losses in the transmission path. As a variant, switches SWk_tx may be omitted since, in the example of FIG. 10, the isolation between the transducers and the transmission path may already be ensured by circuit 162. In this case, the m*n terminals ak may be directly connected to the m*n output terminals sk_tx of circuit 162.

Further, in the example of FIG. 10, circuit 125 comprises m*n switches SWk_rx (k being an integer in the range from 1 to m*n) respectively coupling the m*n terminals ak to the m*n input terminals ek_rx of combiner selector 164. In the shown example, circuit 125 further comprises m*n preamplifiers 166_k (k being an integer in the range from 1 to m*n) respectively placed in series with the m*n switches SWk_rx, between terminals ak and ek_rx. More particularly, in the shown example, for each transducer 103 of sub-array 105, corresponding switch SWk_rx has a first conduction terminal coupled, for example, connected, to the terminal ak coupled to electrode E1 of the transducer, and a second conduction terminal coupled, for example connected, to an input terminal of the amplifier 166_k of same rank k. Further, amplifier 166_k has an output terminal coupled, for example, connected, to the input terminal ek_rx of same rank k of combiner selector 164. In the example of FIG. 10, since preamplifier 166_k is provided upstream of each of the inputs ek_rx of circuit 162, combiner selector 164 further comprises a voltage adder with multiple selectable inputs, adapted to delivering on terminal s_rx a voltage equal to the sum of the voltages applied to the selected input terminals ek_rx. As a variant, preamplifiers 166_k may be omitted, in which case each switch SWk_rx has its second conduction terminal directly coupled to the corresponding input terminal ek_rx of combiner selector 164. In this case, combiner selector 164 may be formed of m*n individually controllable switches only, respectively coupling in parallel its m*n input terminals ek_rx to its output terminal s_rx.

It should be noted that in the example of FIG. 10, the role of switches SWk_rx is essentially to protect the reception path, and particularly preamplifiers 166_k, combiner selector 164, and receive circuit 154 during transmission phases. If, however, the manufacturing technology of elements 166_k (if present), 164 and/or 154 is compatible with the voltage levels +HV and −HV delivered by transmit circuit 152, then switches SWk_rx may be omitted. As a variant, switches SWk_rx may be replaced with protection circuits adapted to clipping high-voltage signals and to only give way to low-voltage signals. As an example, each protection circuit may be formed of an association of two diodes connected in antiparallel (head to tail), a first terminal of the association being coupled, for example connected, to the corresponding terminal ak and the second terminal of the association being coupled, for example, connected, to ground.

Control circuit CTRL is adapted to controlling switches SWk_rx and SWk_tx via control links, not shown in the drawing.

As an example, the different components of electronic control circuit 120 may be integrated in one or a plurality of integrated circuit chips, for example, in CMOS technology.

The device of FIG. 10 operates as follows. During a phase of transmission of an ultrasonic wave, control circuit CTRL controls, in each circuit 125, the turning on of switches SWk_tx and the turning off of switches SWk_rx, and further controls splitter selector 162 to couple the electrodes E1 of the transducers 103 which are desired to be activated to the output terminal out_tx of transmit circuit 152, and to isolate the electrodes E1 of the other transducers of the sub-array from terminal out_tx. During a phase of reception of an ultrasonic wave, control circuit CTRL controls, in each circuit 125, the turning on of switches SWk_rx and the turning off of switches SWk_tx, and further controls combiner selector 164 to couple the electrodes E1 of the transducer(s) 103 which are desired to be activated to the input terminal in_rx of receive circuit 154, and to isolate the electrodes E1 of the other transducers of the sub-array from terminal in_rx.

As a variant (not shown), transmit circuit 152 is a low-voltage circuit, delivering a low-voltage transmit signal, and circuit 125 comprises m*n high-voltage amplification circuits (not shown) respectively placed in series with the m*n switches SWk_tx, between terminals sk_tx and ak. More particularly, for each transducer 103 of sub-array 105, the corresponding amplification circuit may have an input terminal coupled, for example, connected, to the corresponding terminal sk_tx, and an output terminal coupled to the corresponding terminal ak via the switch SWk_tx of same rank k. An advantage of this configuration is that, in each sub-array 105, during a transmission phase, the power delivered to each transducer 103 is the same whatever the number of transducers selected in the sub-array.

Various embodiments and variants have been described. Those skilled in the art will understand that certain features of these embodiments can be combined and other variants will readily occur to those skilled in the art.

In particular, the described embodiments are not limited to the specific embodiment of electronic control circuit 120, and particularly of the combiner selector and/or splitter selector circuits 125, described in relation with FIG. 10.

Further, although only examples of control methods where, during an ultrasonic image acquisition phase, in each sub-array 105 of the device, the same transducers of the sub-array are activated during the phase of transmission of an ultrasonic wave and during the subsequent phase of reception of an echo of the transmitted wave, have been described hereabove in relation with FIGS. 4 to 9, the described embodiments are not limited to this specific case. Thus, acquisition methods where circuits 125 are controlled so that, in a same sub-array 105, the number of transducers 103 activated during the transmission phase is different from the number of transducers 103 activated during the reception phase, may for example be provided.

Further, although only embodiments where, in each sub-array 105, the transducers 103 of the sub-array share a same transmit circuit 152 and a same receive circuit 154, by means of a combiner selector and splitter selector circuit 125, have been described hereabove, the described embodiments are not limited to this specific case. As a variant, a device where, in each sub-array 105, the transducers 103 of the sub-array each have their own transmit circuit and share a same receive circuit via circuit 125, in which case circuit 125 is a combiner selector circuit only, or where, in each sub-array 105, the transducers of the sub-array each have their own receive circuit and share a same transmit circuit via circuit 125, in which case circuit 125 is a splitter selector circuit only, may be provided.

Further, the described embodiments are not limited to the examples detailed hereabove where sub-arrays 105 all have the same dimensions. As a variant, distinct sub-arrays 105 of array 100 may have different dimensions (that is, different numbers of rows and/or numbers of columns).

The invention claimed is:

1. An ultrasonic imaging device comprising a plurality of ultrasonic transducers arranged in an array of a plurality of rows and a plurality of columns, the array being divided into a plurality of sub-arrays of neighboring transducers, each comprising m rows and n columns, m and n being integers greater than or equal to 2, the device comprising:
   a control circuit having, for each sub-array:
      a single transmit and/or receive circuit including a transmit circuit comprising a pulse generator and a receive circuit comprising an amplifier; and
      a combiner selector and/or splitter selector circuit configurable to couple any and only one of the transducers of the sub-array to the transmit and/or receive circuit of the sub-array, or to simultaneously couple a plurality of the transducers of the sub-array to the transmit and/or receive circuit of the sub-array,
   wherein the control circuit is adapted for individually controlling the combiner selector and/or splitter selector circuits of the different sub-arrays,
   wherein the control circuit is configured to, during a phase of acquisition of an ultrasonic wave of a first type, successively acquire m*n partial images of a body, and then reconstruct the image from the m*n acquired partial images, and
   wherein the control circuit is configured to, at each acquisition of a partial image, in each sub-array, coupled to the transmit and/or receive circuit of the sub-array a single transducer selected among the m*n transducers of the sub-array, and to modify the transducer selected in each sub-array for each new acquisition of a partial image to involve the m*n transducers of each sub-array.

2. The device according to claim 1, wherein the control circuit is further configured to, during a phase of acquisition of an ultrasonic wave of a second type, control the combiner selector and/or splitter selector circuits to, simultaneously:
- in a first sub-array, couple a single transducer of the sub-array to the transmit and/or receive circuit of the sub-array; and
- in a second sub-array, couple a plurality of transducers of the sub-array to the transmit and/or receive circuit of the sub-array.

3. The device according to claim 1, wherein the control circuit is further configured to, during a phase of acquisition of an ultrasonic image of a third type, control the combiner selector and/or splitter selector circuits to, in each sub-array, simultaneously couple all the transducers of the sub-array to the transmit and/or receive circuit of the sub-array.

4. The device according to claim 1, wherein the control circuit is further configured to, during a phase of acquisition of an ultrasonic wave of a fourth type, control the combiner selector and/or splitter selector circuits to, in each sub-array, successively:
- simultaneously couple all the transducers of a same column of the sub-array to the transmit and/or receive circuit of the sub-array and simultaneously isolate the other transducers of the sub-array from the transmit and/or receive circuit of the sub-array;
- simultaneously couple all the transducers of a same row of the sub-array to the transmit and/or receive circuit of the sub-array and simultaneously isolate the other transducers of the sub-array from the transmit and/or receive circuit of the sub-array; and
- simultaneously couple all the transducers of a same diagonal of the sub-array to the transmit and/or receive circuit of the sub-array and simultaneously isolate the other transducers of the sub-array from the transmit and/or receive circuit of the sub-array.

5. The device according to claim 1, wherein, for each sub-array, the combiner selector and/or splitter selector circuit comprises a transmit splitter selection from one input terminal to m*n output terminals and a receive combiner selector from m*n input terminals to one output terminal, and wherein:
- the input terminal of the transmit splitter selector is coupled to an output terminal of the transmit circuit;
- the m*n output terminals of the transmit splitter selector are respectively coupled to the m*n transducers of the sub-array;
- the m*n input terminals of the receive combiner selector are respectively coupled to the m*n transducers of the sub-array; and
- the output terminal of the receive combiner selector is coupled to an input terminal of the receive circuit.

6. The device according to claim 5, wherein, in each combiner selector and/or splitter selector circuit, the m*n output terminals of the transmit splitter selector are coupled to the m*n transducers of the sub-array by respectively m*n transmit switches, and wherein the m*n input terminals of the receive combiner selector are coupled to the m*n transducers of the sub-array by respectively m*n receive switches.

7. The device according to claim 6, wherein, in each combiner selector and/or splitter selector circuit, the m*n input terminals of the receive combiner selector are further coupled to the m*n transducers of the sub-array by respectively m*n preamplifiers.

8. The device according to claim 1, wherein the control circuit is configured to control the combiner selector and/or splitter selector circuits to, during an ultrasonic image acquisition phase, in each sub-array, during an ultrasonic wave transmission phase, couple a first set of ultrasonic transducers of the sub-array to the transmit circuit of the sub-array, and, during a subsequent phase of reception of an ultrasonic wave, couple a second set of ultrasonic transducers of the sub-array, different from the first set, to the receive circuit of the sub-array.

* * * * *